United States Patent [19]
Bianchetta et al.

[11] 3,727,730
[45] Apr. 17, 1973

[54] VEHICLE POWER AND BRAKE COOLING CONTROL

[75] Inventors: Donald L. Bianchetta, Coal City; Richard E. Guhl; Samuel L. Kershaw, both of Decatur; John F. Szentes, Peoria, all of Ill.

[73] Assignee: Caterpillar Tractor Co., Peoria, Ill.

[22] Filed: Jan. 31, 1972

[21] Appl. No.: 222,407

Related U.S. Application Data

[63] Continuation of Ser. No. 16,864, March 5, 1970, abandoned.

[52] U.S. Cl..................192/3 R, 188/264 P, 192/2, 137/625.66
[51] Int. Cl.........................B60k 29/02, F16d 65/84
[58] Field of Search............192/3 R, 1, 2; 188/264 P, 264 F, 264 D

[56] References Cited

UNITED STATES PATENTS

| 2,537,444 | 1/1951 | Click | 192/3 R |
| 2,876,877 | 3/1959 | Selyem | 192/3 R |
| 3,044,582 | 7/1962 | Gold et al. | 188/264 P |
| 3,110,378 | 11/1963 | Qualman | 192/3 R |
| 3,259,216 | 7/1966 | Klaus et al. | 192/3 R X |

*Primary Examiner*—Benjamin W. Wyche
*Attorney*—Fryer, Tjensvold, Feix, Phillips & Lempio

[57] ABSTRACT

A vehicle retarding system in which the heat of a retarding brake is absorbed by cooling medium supplied from a motive means driven by the vehicle engine, including means operable when the brake is used to effect retarding, to increase the speed of the engine and consequently the volume of the cooling medium directed to the brake, and also including means to disconnect the vehicle drive so that the increased engine speed is not transmitted to the vehicle wheels.

8 Claims, 4 Drawing Figures

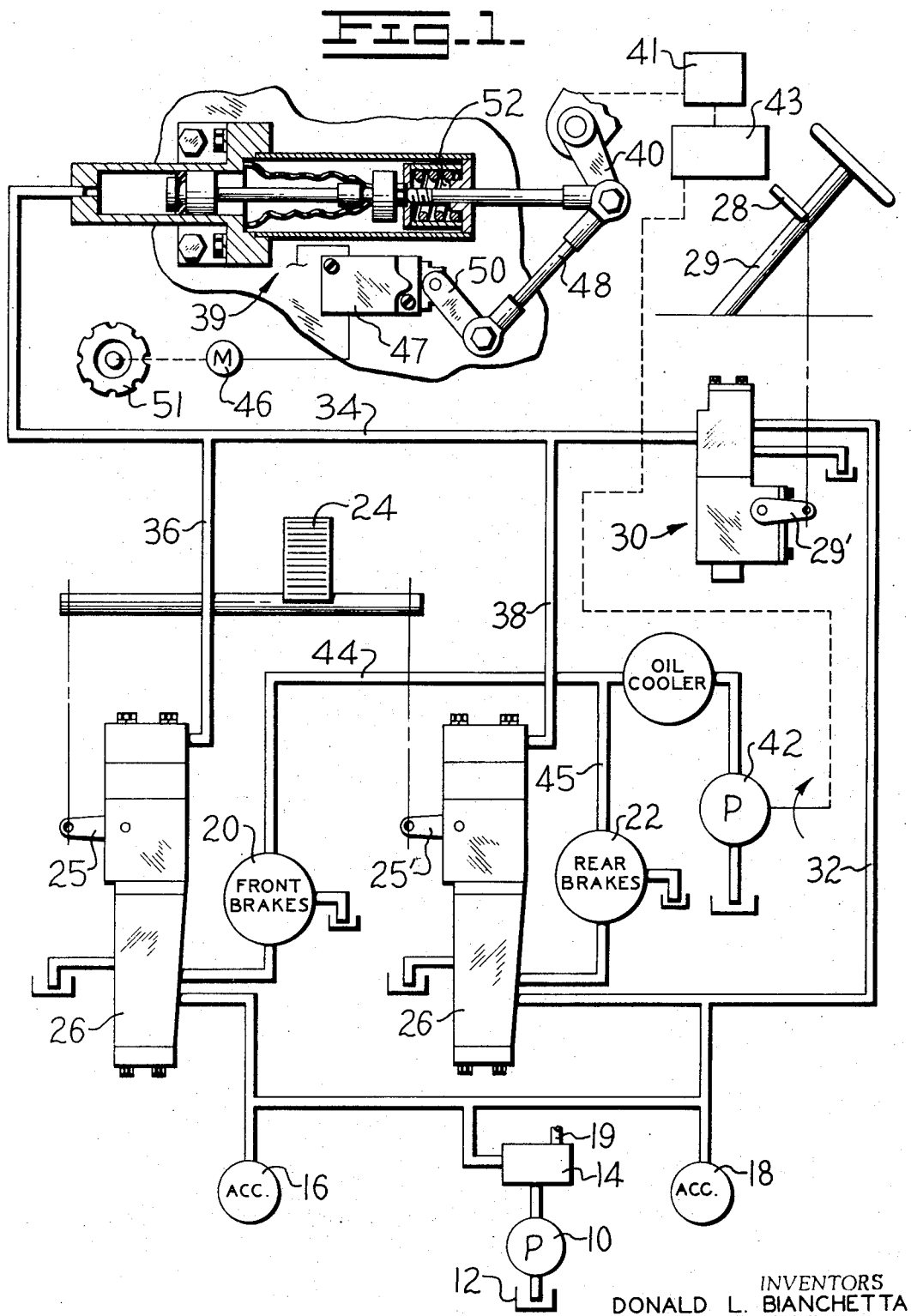

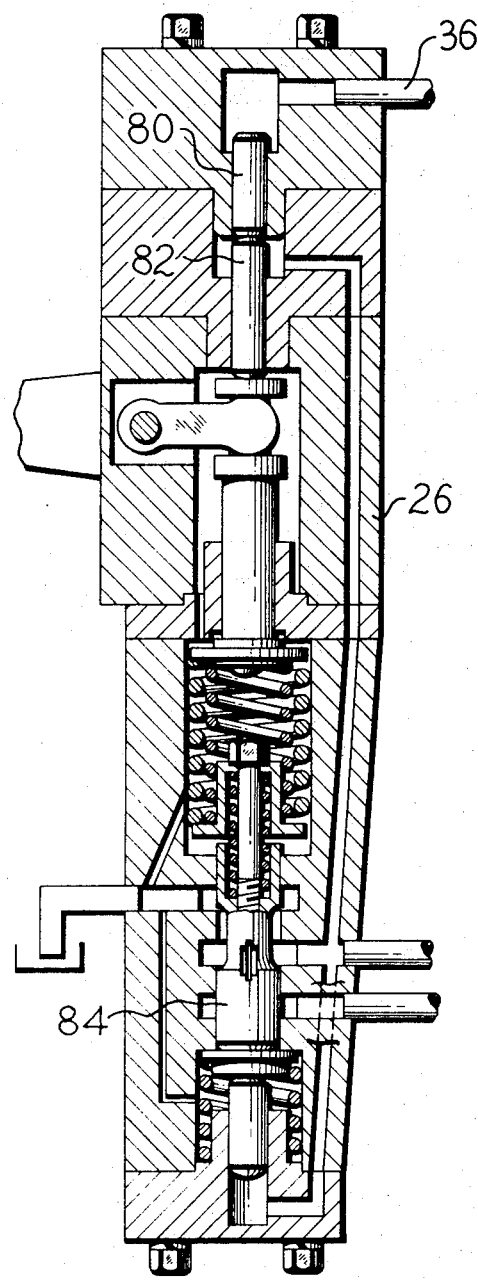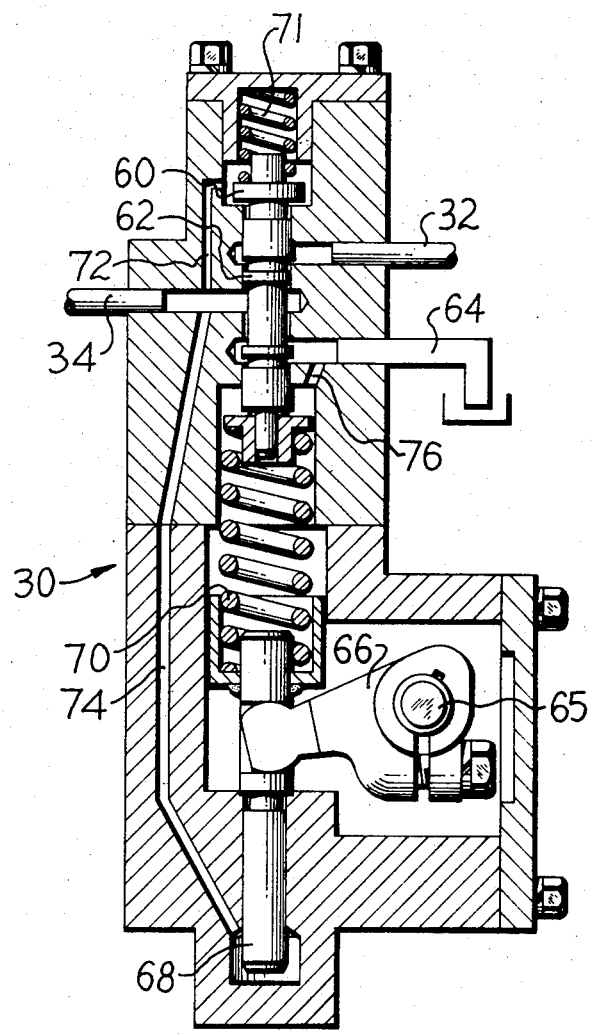

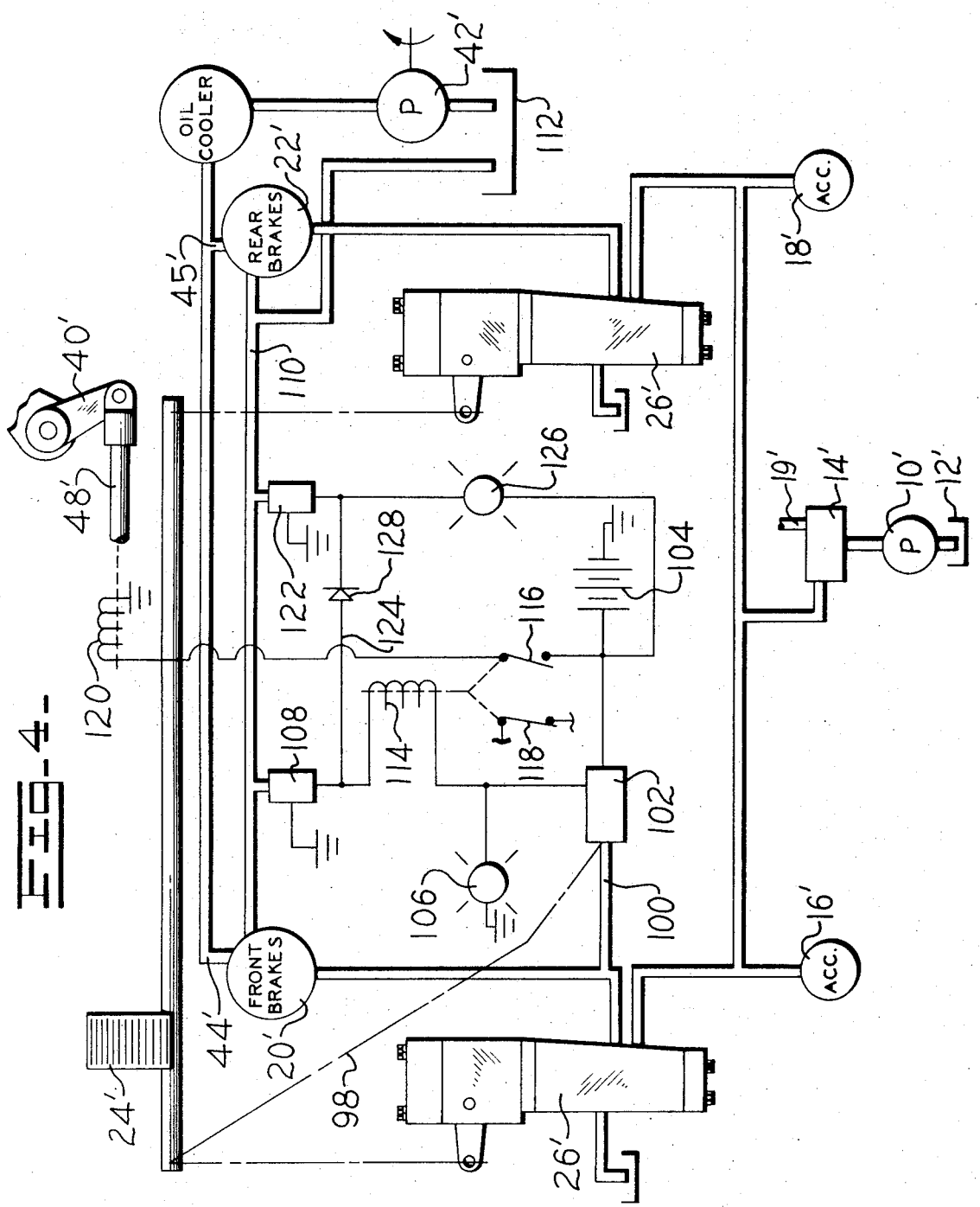

VEHICLE POWER AND BRAKE COOLING CONTROL

This application is a continuation of U.S. Pat. application Ser. No. 16,864, filed on March 5, 1970, and now abandoned.

Modern, off-highway trucks have attained such great size and capacity that retardation and braking have become serious problems. Trucks manufactured by our assignee employ hydrodynamic, shoe, caliper, electric, disc, oil cooled disc type brakes, etc., which are very large and ordinarily quite efficient. However, the tremendous energy required for retarding the speed of such vehicles is converted to heat which must be dissipated to prevent brake failure. Under circumstances where the brakes are applied for a long period of time, such as on a downhill run, and particularly when truck engine speed is reduced, the supply of cooling medium is inadequate.

The present invention overcomes this cooling medium deficiency by increasing engine speed when the brakes are applied for retarding vehicle speed. Since increased engine speed tends to increase vehicle speed, the invention also provides means to discontinue drive to the wheels during retarding. The trucks specifically referred to are of the electric drive type so the drive is interrupted by preventing drive motor excitation. It is recognized, however, that the drive means of conventional motor driven trucks could also be interrupted.

Two modifications of the invention are shown on trucks equipped with oil cooled disc brakes, and will be described herein. It is recognized that the subject invention could be applied to well-known retarding arrangements which employ any one of the several conventional cooling mediums such as oil, water or air. In one modification, retarding is initiated by a hand control lever which might be located on the steering column or other position which is convenient for the operator, and this lever actuates a modulating control valve which, in turn, affects pilot operation of a brake valve and a slave cylinder which increases throttle setting. In the second modification, the temperature of the brake cooling oil is sensed and the engine speed is increased to provide an increased flow at a predetermined temperature level. In both systems, drive motor excitation is interrupted when the engine speed is increased.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

A more complete understanding of the invention is set forth in the following specification wherein reference is made to the accompanying drawings.

In the drawings:

FIG. 1 is a schematic illustration of the hydraulic circuitry employed in a hand actuated vehicle retarding system embodying the present invention;

FIG. 2 is a sectional view of one of the brake valves illustrated in FIG. 1;

FIG. 3 is a sectional view of a control valve in the circuit of FIG. 1; and

FIG. 4 is a schematic view of a preferred form of the invention in which engine speed is increased to provide increased flow of cooling oil automatically when the oil attains a predetermined temperature.

Referring first to FIG. 1 which shows a hand controlled retarding system, a pump 10 directs fluid from a reservoir 12 through an accumulator charging valve 14 to two accumulators 16 and 18. A branch line 19 directs fluid to other circuits such as for steering or implement control. The accumulators provide fluid for actuation of front and rear disc brakes which are schematically illustrated at 20 and 22, respectively, upon depression of a foot pedal 24 which, through appropriate linkage represented at 25 and 25′, adjusts brake valves 26. The valves 26 are of conventional construction and are pressure modulated brake valves fully disclosed in our assignee's patent to Lohbauer, U.S. Pat. No. 3,423,136, with the exception of a minor modification presently to be described.

To initiate retarding of the vehicle, a hand control lever 28 shown as mounted on a steering column 29 actuates appropriate linkage represented at 29′ to shift a modulating control valve 30 which directs pilot pressure by way of a conduit 32 from the accumulator 18 to a pilot line 34 which directs pressure to each of the brake valves 26 by way of conduits 36 and 38 and to the head end of a single acting slave cylinder generally indicated at 39. The modulated pressure in conduits 36 and 38 shifts valves 26 to direct a predetermined pressure from accumulators 16 and 18 to brakes 20 and 22 to impart a degree of retardation of the vehicle as determined by the operator. Pressure in conduit 34 also actuates a single acting slave cylinder 39 which mechanically moves linkage 40 of governor or other suitable throttle means 41 to the high idle position. This increases engine speed and increases hydraulic oil flow through pump 42 driven by engine 43, through conduits 44 and 45 to the oil cooled disc brakes. To prevent excitation of a drive motor 46 normally electrically driven by engine 43 through a generator in a conventional manner, when the engine speed is increased to high idle in this manner, a normally closed microswitch 47, which is in the motor circuit, is connected to the rod end of the slave cylinder 39 by links 48 and 50 as shown. This interrupts excitation of the motor field and thereby prevents drive of the vehicle wheels, one of which is schematically shown at 51.

Shifting of the hand control level 28 to its off position vents pilot pressure from the brake valves and slave cylinder. The throttle linkage is returned to the normal idle position by way of a biasing spring 52 in the rod end of the slave cylinder 39 and this also returns the microswitch 47 to its normally closed position so that the vehicle can be operated in its normal manner. The brake foot pedal 24 can be operated to override retarding and provide normal foot actuator braking at any time.

In FIG. 3, the hand actuated control valve 30 is illustrated in greater detail and operates in a manner similar to the brake valve disclosed in the Lohbauer patent referred to above. The valve 30 comprises a spool 60 having a land 62 thereon positioned to open and control flow toward the pilot line 34. In the position shown, the inlet from conduit 32 is closed and conduit 34 is opened to tank by way of a return line 64. The spool is actuated by manipulation of the hand control lever on the steering column which, through suitable linkage partially shown at 29' in FIG. 1, oscillates a shaft 65 having a fork 66 secured thereto. The free end of the fork engages a groove in a rod 68 which is reciprocally supported in the valve housing. When the hand control lever is actuated to swing the fork 66 upwardly, the rod 68 will act, through the medium of a spring 70, to move the spool 60. The spring 70 has a low assembly preload and is not noticeably compressed during movement of the valve spool 60 which is accompanied by compression of a return spring 71 acting against the opposite end of the spool. When the spool is moved upwardly to its open position, the return line 64 is blocked and communication is made between conduit 32 and conduit 34. Pressure in conduit 34 is communicated through a passage 72 to the upper end of the spool 60 to urge the spool toward its normal or closed position. The same pressure also acts through a passage 74 to communicate with the end of rod 68 and act as a booster to reduce operator effort in shifting the hand control lever. When pressure in line 34 reaches a level proportionate to the setting of the lever 28, that pressure acting on the end of spool 60 is sufficient to return the spool to a modulating position. Leakage fluid which might accumulate in the chamber of spring 70 is returned to the reservoir through passage 76 provided for that purpose.

FIG. 2 illustrates the slight modification made to the brake valve of the Lohbauer patent referred to above to permit actuation of the brakes with pilot pressure by the hand controlled lever for retarding purposes. The modification includes an actuating piston 80 which, upon introduction of pilot pressure through line 36, shifts the piston 82 of the valve shown at 26 downwardly to move spool 84 downwardly to communicate fluid from the accumulator 16, for example, to the front brakes 20. Fluid from accumulator 18 is, of course, communicated to the rear brakes 22 in the same fashion. There may be brake systems employing a single brake valve for communicating pressure to both the front and rear brakes of a vehicle and the adaptation of the invention to such an arrangement is obvious.

FIG. 4 discloses a proposed commercial version of the retarding circuit of the present invention which is more fully automatic and actuated entirely through a brake pedal and increasing engine speed in response to depression of the brake pedal and temperature of the brake cooling oil. In FIG. 4, parts similar or identical to those of FIG. 1 are designated by the same reference characters primed. When a brake pedal illustrated at 24' is depressed, it shifts the brake valves 26' through suitable linkage. These valves modulate pressure of fluid from accumulators 16' and 18' to the front and rear disc brakes 20' and 22', respectively in a known manner. An engine driven pump 42' directs fluid by way of conduits 44' and 45' to the brakes for cooling as previously described. Application of the brakes for retarding closes an electrical pressure switch 102 either through mechanical linkage which is represented at 98 or alternately by brake actuating pressure communicated by way of conduit 100. Closing of switch 102 directs electrical energy from a battery 104 to grounded signal means 106; in this case, shown as a light. Light 106 indicates to the operator that the brakes are on either parking, service or retarding with the possibility that the engine speed can increase to high idle. It is to be understood that the service brakes are used as parking brakes with means to lock them in their engaged position for this purpose.

An electrical temperature actuated switch 108 senses the temperature of the brake cooling oil in conduit 110 as it is returned to reservoir 112. When the temperature reaches a predetermined value, the switch 108 is closed to pass electrical energy through coil 114 of a relay which mechanically closes relay switch 116 and opens switch 118. Closing switch 116 completes the circuit between the battery, or source 104, and a grounded solenoid 120. This solenoid mechanically actuates the throttle linkage 48' and 40' to increase the engine speed as previously described. Increased engine speed increases the oil flow from the engine driven pump 42' to the oil cooled disc brakes. Opening of switch 118 produces a neutral condition in the drive transmission. Specifically in this electric drive circuit, the selector control circuit is disconnected from the drive circuit by means of a circuit breaker comprising a microswitch similar to microswitch 47 shown in FIG. 1.

As a safety measure a second electric temperature actuated switch 122 is set to sense a higher temperature which may be considered the maximum desired oil temperature of the cooling oil. Should switch 108 fail to perform properly, switch 122 will complete the circuit by way of a branch line 124. A signal means 126 also shown as a light is energized when switch 122 closes indicating to the operator that the low temperature sensing circuit has failed and therefore needs service.

A unidirectional diode 128 in the branch line 124 prevents conduction through signal light 126 when the switch 108 is closed.

We claim:

1. A vehicle retarding system comprising an engine, motor driven wheels each having a motor drivingly connected thereto, means controlling said motors, braking means associated with said wheels, means for selectively actuating said braking means, cooling means normally cooling said braking means at a predetermined flow rate and including engine driven pump means directing coolant fluid from a reservoir to said braking means, means responsive to actuation of said braking means by said actuating means for increasing the normal rate of cooling of said braking means and including a movable rod member, control means actuated by and connecting said movable rod member to said engine driven pump means, said control means including a mechanical linkage connected to said movable rod member and to said engine and said motor control means, respectively, for simultaneously increasing the speed of the engine and thereby the pump driven therefrom whereby an increased coolant flow will be directed from said reservoir to said braking means and to actuate said motor control means to control said motors whereby the increased speed of the engine will not be transmitted thereto.

2. The combination of claim 1 wherein the movable rod member is a flush controlled piston rod.

3. The combination of claim 1 wherein the movable rod member is an electrically controlled solenoid armature.

4. The combination of claim 3 wherein the actuating means comprises at least one temperature sensitive switch associated with and responsive to a predetermined temperature level of said coolant fluid.

5. The combination of claim 3 wherein the actuating means comprises at least two temperature sensitive switches associated with and responsive to different temperature levels of said coolant fluid.

6. The combination of claim 1 wherein the means controlling said motors are switches.

7. The combination of claim 2 wherein the means controlling said motors are switches.

8. The combination of claim 1 wherein said braking means are disc brakes.

* * * * *